Sept. 27, 1927.　　　　　　　　　　　　　　　　1,643,366
A. BENZ, JR
DOUGH CONDITIONING MACHINE
Filed Oct. 2, 1922　　　　　3 Sheets-Sheet 1
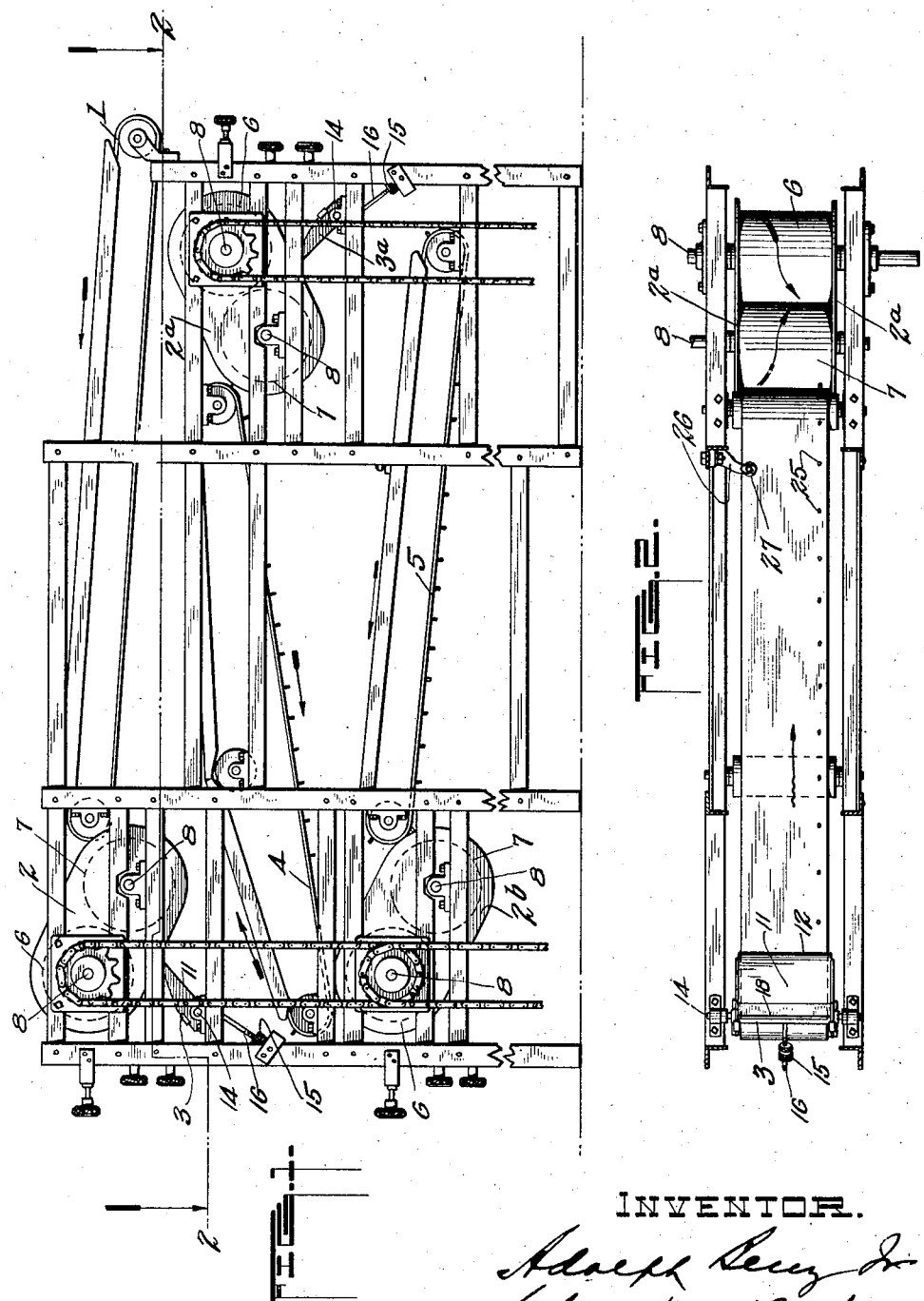
INVENTOR.

Sept. 27, 1927.
A. BENZ, JR
1,643,366
DOUGH CONDITIONING MACHINE
Filed Oct. 2, 1922    3 Sheets-Sheet 2
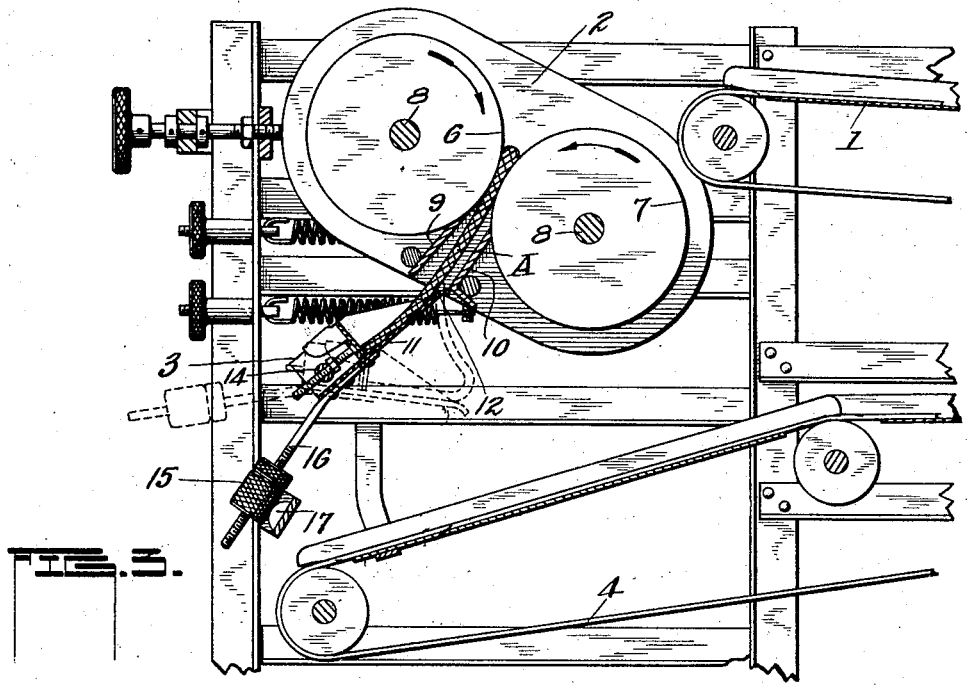
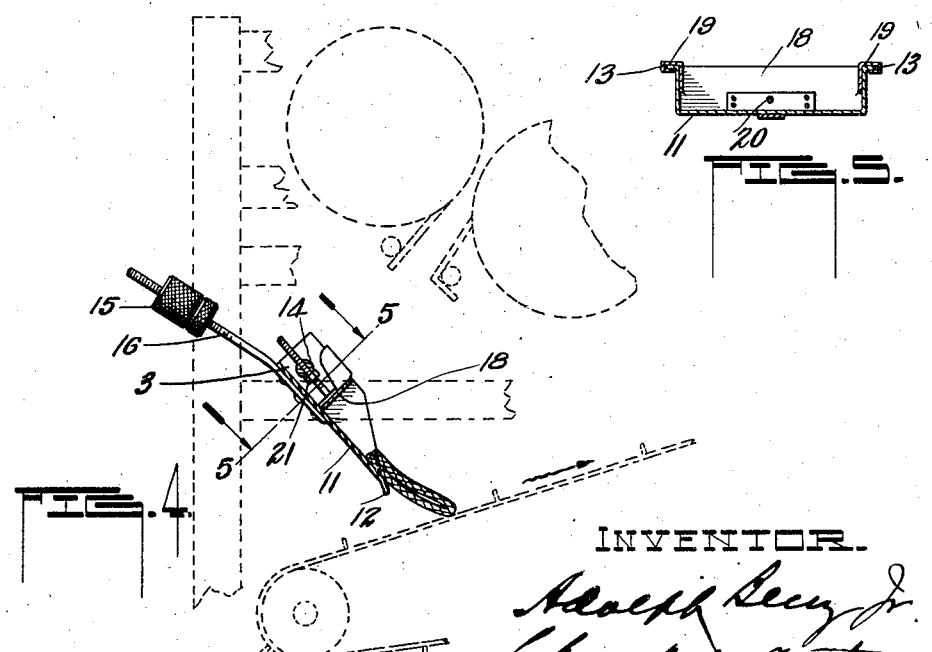
INVENTOR.

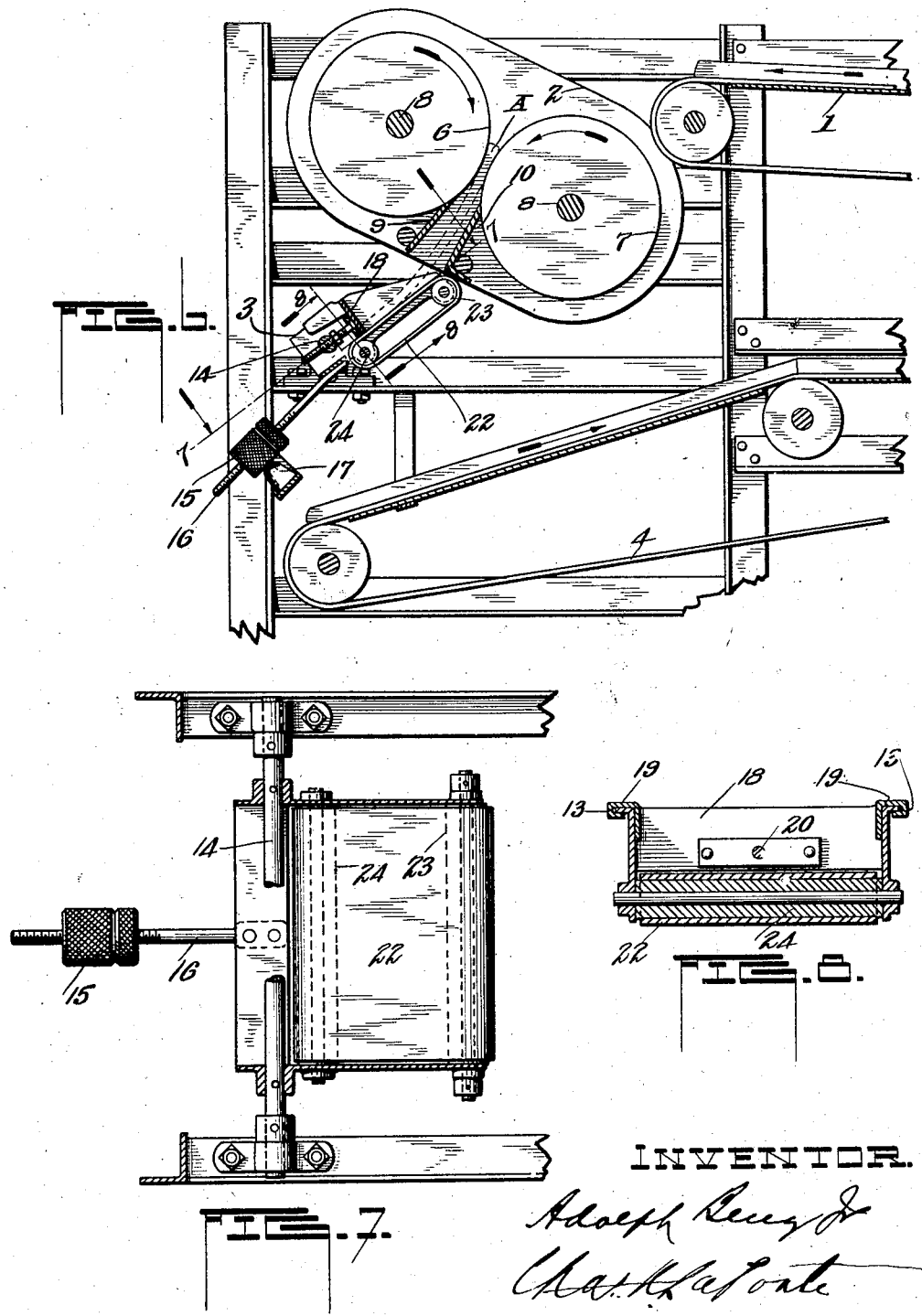

Patented Sept. 27, 1927.

1,643,366

UNITED STATES PATENT OFFICE.

ADOLPH BENZ, JR., OF PEORIA, ILLINOIS.

DOUGH-CONDITIONING MACHINE.

Application filed October 2, 1922. Serial No. 591,789.

This invention has reference to a machine for conditioning the gluten of the dough in the making of bread, and it has for its principal object to improve the machinery for practicing the method described and claimed in Letters Patent granted to me February 22, 1921, No. 1,369,724, and also to improve the apparatus described and claimed in Letters Patent granted to me October 3, 1922, No. 1,430,616.

A further object of the invention is to provide in a conditioning machine of the character referred to, a new and improved tripping and folding means for the individual loaf units as the same are passed through the machine; such tripping and folding means being multiplied in the machine as many times as good practice may deem desirable and suitably spaced relatively to each other, so that the individual loaf units may be alternately sheeted or rolled and folded by a single fold, and such sheeting or rolling and folding repeated as many times as may be desired.

In carrying out the invention, the tripping and folding units may include an oscillatory element arranged to receive a sheeted or rolled loaf unit which overbalances and tips the tripping and folding unit which causes the loaf unit to be folded by a single fold and during such folding to discharge the folded loaf unit in position to be conveyed to the next and successive tripping and folding unit. To lessen the friction, if any there may be between the loaf unit and the oscillatory element, such element may comprise a movable part, such for instance as an endless belt.

The invention comprehends conveying means between the tripping and folding units for conveying the loaf units to the first and then the succeeding tripping and folding units, of a character somewhat similar to that disclosed in the said patent and application for patent, except that the conveying elements are preferably superimposed in the same vertical plane, and the tripping and folding elements are alternately disposed in staggered arrangement at opposite ends of the machine.

Although forming no part of the present invention, a turning means is shown for turning each folded loaf unit approximately a one quarter turn between each tripping and folding operation. The successive operations of sheeting or rolling and folding each loaf unit by a single fold, first in one direction and then in an opposite direction, results in a complete kneading of the dough constituting the said loaf units, stretching the gluten tissues and delivering the said loaf units from the conditioning machine in a state of elasticity, which is equal to, if not better, than the elastic condition in which the dough was in after the "fermenting" step and when it was received by the "divider" or "scaling" machine.

That the invention may be more fully understood, reference is had to the accompanying drawings forming a part of the present description, illustrating a preferred embodiment of the invention, in which:—

Figure 1 is a side elevation of a machine, partly broken away, for conditioning the gluten of the dough in the making of bread and having my improvements embodied therein;

Figure 2 is a cross-section, in plan, as the same would appear, if taken on the line 2—2 Figure 1;

Figure 3 is a sectional detail, in elevation, showing the tripping and folding means and a single loaf unit being delivered thereto after the sheeting or rolling operation, dotted lines showing the tipping of the tripping means and the folding of the loaf unit on itself, by a single fold;

Figure 4 is a detail sectional view showing the tripping and folding means at the limit of its movement and at the time when the folded loaf unit is delivered to a conveyer, the conveyer and sheeting or rolling means being shown in outline in dotted lines;

Figure 5 is a detail sectional view, as the same would appear if taken on the line 5—5 Figure 4;

Figure 6 is a view similar to Figure 3, except that it shows the tripping and folding unit having a movable delivery member, such for instance as an endless belt;

Figure 7 is a cross-section, in plan, partly broken away, as the same would appear if taken on the line 7—7 Figure 6, and Figure 8 is a sectional detail as the same would appear if taken on the line 8—8 Figure 6.

Like characters of reference denote corresponding parts throughout the figures.

The machine frame may be constructed in any suitable manner, and therefore no detailed description will be given of the parts constituting the frame as it is shown. Furthermore, while in Fig. 1 there are shown at least two sets of trippers and folders and three sets of sheeting and rolling means for the individual loaf units, and conveying means associated therewith to transfer the loaf units from one sheeting or rolling means to the next, it is to be understood that these elements may be multiplied as many times as is consistent with good practice, and that it is considered desirable to sheet or roll and fold the individual loaf units at least four or six times, altho by such statement it is not intended to place any limitation thereon. It is to be further understood that in connection with each transfer means a turning means is provided for turning each folded unit at least a one-quarter turn.

In the drawings a conveyor 1 is shown adapted to receive the individual loaf units from the "divider" or "scaling" machine and conveyed into the present machine to be subsequently sheeted or rolled and folded and such operation progressively and successively carried on until the loaf units are discharged from the conditioning machine. The loaf units are discharged from the conveyor 1 to a sheeting or rolling means 2, and upon leaving such sheeting or rolling means the loaf units are folded once upon themselves by means of a tripper and folder 3 which deposits the successive folded loaf units onto a conveyor 4 which discharges the same to a sheeting or rolling means $2^a$, similar to that designated 2, and such loaf units as they leave the sheeting and rolling means $2^a$ are deposited on a tripping and folding means $3^a$, similar to that designated 3 and the successive folded loaf units deposited on a conveyor 5 which conveys the loaf units to a sheeting or folding means $2^b$ similar to those designated 2 and $2^a$. At this point the machine in Fig. 1 is broken away, it being understood, as previously stated, that the sheeting or rolling means, the tripping and folding means and the transfer conveyors may be multiplied as many times as may be desired, the drawing illustrating the manner and form in which such multiplication of parts may be carried out.

This application is directed to the tripping and folding means, which is duplicated thruout the machine, therefore the description of one will suffice for all and in connection with such tripping and folding means one sheeting and folding means will be described, which, as will be understood is duplicated in connection with the other tripping and folding means employed in the machine.

The sheeting and rolling means includes preferably a pair of rollers 6 and 7 carried upon shafts 8 suitably journaled in the frame of the machine. The roller 6 see Fig. 3, rotates in a clock-wise direction, and the roller 7 rotates in an anti-clock-wise direction, the two rollers being suitably disposed relatively to the discharge end of the conveyor 1 and with respect to each other, so as to receive the loaf units from the conveyor 1 and passed down therebetween, so as to sheet or roll a loaf unit A in a manner shown in full lines in Fig. 3. I preferably employ scraper guides 9 and 10 between which the loaf units A are delivered in a sheeted or rolled manner from the rollers 6 and 7. In such sheeted or rolled manner said loaf units A are received by a tripping and folding means 3, previously referred to.

The tripping and folding means preferably comprises a pan 11 including a bottom the forward edge of which is beveled downwardly as at 12, and flanged sides the upper edges of which are turned at right angles as at 13, see Fig. 5. The pan is connected to a transverse rod 14 having a suitable pivotal connection with the machine frame so that the pan is supported for oscillatory movement in the machine, the fulcrum point of the pan being near the rear end thereof to provide for a long sweep of the pan during its oscillation and to provide for the proper folding of the loaf units as they are received by the pan, and during the oscillation of the pan to discharge the folded loaf units onto a receiving conveyor. As shown, the pan is provided with counter-balancing weights 15 adjustable on a rod 16 secured to the pan; such counter-balancing weights normally hold the pan in a preferably upwardly inclined position with the beveled forward edge 12 lying beneath and just at the lower end of the scraper guide 10 whereby as the loaf units A are sheeted or rolled between the rollers 6 and 7 and the same caused to be passed down between the scraper guides 9 and 10, such sheeted or rolled loaf units will slide directly onto the pan 11, the weight of the loaf units overbalancing the weights 15, causing the same to be oscillated, gradually moving from the full line position shown in Fig. 3 to the full line position shown in Fig. 4, and as such pan is tripped by the weight of the loaf units and such pan assumes a position such as shown in dotted lines in Fig. 3, the loaf units passing under the scraper guide 10 will be caused to assume the semi-folded position shown in dotted lines in Fig. 3 and then to finally assume the folded position shown in full lines in Fig. 4, and as the pan 11 reaches the limit of its discharging position the folded loaf units will slide from the pan onto the receiving conveyor thereunderneath. At such time the counter-balancing weights 15 act to move the pan to receiving position, such weights preferably engaging a cushion 17 secured to the frame in a suitable manner, which will relieve the shock incident to the pan moving to receiving position and prevent jarring. The pan 11 is provided with an adjustable gage wall 18 with which the ends of the sheet or rolled loaf units will come into contact as they slide onto the pan 11 from the sheeting or rolling means. This gage wall is adjusted to the size of the loaf units which are intended to be run thru the machine, whereby a proper folding of such loaf units may be made as they are received by the tripping and folding means. This gage wall 18 is provided with guides 19 embracing the flanges 13 of the pan so as to permit longitudinal adjustable movement of the gage wall 18 on the side walls of the pan, and such gage wall has also connected thereto a threaded stem 20 which extends transversely thru the rod 14 and the same adjusted and held in adjusted positions by means of a nut 21 having a threaded engagement with the rod 20.

In Figs. 6, 7 and 8 I have shown the bottom of the pan 11, as being a movable bottom instead of a stationary bottom as shown in Figs. 3 and 4. This movable bottom includes preferably a belt 22 passing around a roll 23 at the receiving end of the pan and around a roller 24 near the rear end thereof and in such position so that the gage wall 18 may be adjustable thereabove. It will be obvious that the provision of a movable bottom will accentuate somewhat the discharge of the folded loaf units from the pan when the pan is oscillated to discharging position, and may have a tendency to prevent friction which might retard the discharge of the folded loaf units from the tripping and folding means.

Altho forming no part of the present invention there is shown a means for turning the folded loaf units approximately a one-quarter turn between each sheeting or rolling and folding operation which is for the purpose of completely kneading the dough constituting the said load units, stretching the gluten tissues and discharging the said loaf units completely conditioned. Such turning means includes a plurality of spaced obstructions or pins 25 arranged in or on the conveyors 4 and 5, and others which may be employed, with the exception of the conveyor 1 in which they are not needed. The obstructions or pins 25 are preferably located adjacent one edge of the conveyors and supported by the machine frame and overlying the opposite edge of such conveyors are obstruction arms 26 preferably provided with rollers 27.

As the folded loaf units are discharged from a sheeting and rolling means and the tripping and folding means onto a transfer conveyor they lie cross-wise of each transfer conveyor, either between a pair of obstructions or pins 25 or engaging the same, and as such folded loaf units come into contact with the arm 26 or the roller thereon, such loaf units are caused to be turned in their path at least a one-quarter turn, so that the loaf units are successively sheeted or rolled and folded, first in one direction and then in an opposite direction, as will be understood and as has been clearly set forth in the patent and application above mentioned.

It should be obvious that it is immaterial how and in what manner the several transfer conveyors are operated, and also how and in what manner the rollers 6 and 7 are operated, so long as a provision is made for actuating the same from a driving means on the machine. It is preferable to only operate one of each of the sets of rollers 6 and 7, altho both rollers of each set may be positively actuated if it is so desired.

What I claim is:—

1. In a machine of a character described, means for folding a loaf unit by a single fold, comprising sheeting rollers and a counter-balanced pivoted member therebeneath adapted to receive a sheeted loaf unit, the weight of which will overbalance and trip such member and cause it to be oscillated, and during such oscillation be folded on itself and means to receive such folded unit.

2. In a machine of the character described, means for folding a loaf unit by a single fold, comprising a pivoted pan adapted to receive a sheeted loaf unit and to be oscillated by the weight of such unit and during such oscillation to be folded on itself and discharged from said pan, an adjustable gage board on said pan, and counter-balancing means for said pan to move the pan to receiving position after each operation.

3. In a machine of the character described, in combination, means for sheeting loaf units, a folding means upon which such sheeted units are deposited and movable by the weight thereof and during such movement cause said loaf units to be folded on themselves, and transfer means upon which the folded loaf units are deposited as folded.

4. In a machine of the character described, in combination, means for sheeting loaf units, a folding means upon which such sheeted units are deposited and movable by the weight thereof and during such movement cause said loaf units to be folded on themselves, transfer means upon which said folded loaf units are deposited as folded, and means to return the folding means to receiving position after each operation.

5. In a machine of the character described, in combination, means for sheeting loaf units including a pair of coacting rollers, a pivoted pan positioned below said rollers adapted to receive the sheeted loaf units and movable by the weight of such units to fold such units once upon themselves by a single fold, means to guide the sheeted loaf units from the rollers to said pan, and a transfer means to receive said loaf units from said pan.

6. In a machine of the character described, in combination, means for sheeting loaf units including a pair of coacting rollers, a pivoted pan positioned below said rollers adapted to receive the sheeted loaf units and movable by the weight of such units to fold such units once upon themselves by a single fold, means to guide the sheeted loaf units from the rollers to said pan, a transfer means to receive said loaf units from said pan, and means to return the pan to receiving position after the discharge of each loaf unit onto said transfer means.

7. In a machine of the character described, in combination, means for sheeting loaf units including a pair of coacting rollers, a pivoted pan adapted to receive the sheeted loaf units and movable by the weight of such units, an adjustable gage board for said pan, means to guide the sheeted loaf units from the rollers to said pan, a transfer means to receive said loaf units from said pan, and means to return the pan to receiving position after the discharge of each loaf unit onto said transfer means.

8. In a machine of the character described, in combination, a plurality of loaf unit sheeting means having a spaced relation relatively to each other, transfer means between said sheeting means, a folding means associated with each of said sheeting means and adapted to receive the sheeted loaf units from said sheeting means and to deposit the folded loaf units onto a transfer means, means to guide the sheeted loaf units from the sheeting means, and means to return the folding means to receiving position after each operation.

9. In a machine of the character described, in combination, a plurality of loaf unit sheeting means having a spaced relation relatively to each other, transfer means between said sheeting means, a folding means associated with each of said sheeting means, comprising a counter-balanced pivoted pan adapted to receive the sheeted loaf units from said sheeting means and actuable by the weight of the sheeted units to cause the sheeted units to be folded and discharged onto a transfer means, a gage board adjustable on said pans, and means to guide the sheeted loaf units from the sheeting means to the folding means and to cooperate with the folding means during the folding of the loaf units.

10. In a machine of the character described, in combination, means for sheeting a loaf unit comprising a pair of coacting rollers, and means to receive the sheeted units, fold the same by a single fold and to discharge such folded units, said folding means including an anti-friction support.

In witness whereof I have hereunto affixed my hand this 30th day of September, 1922.

ADOLPH BENZ, Jr.